C. C. HARTZELL.
FASTENER FOR SECTIONAL COAL AUGER NUTS.
APPLICATION FILED NOV. 3, 1919.
1,368,928. Patented Feb. 15, 1921.
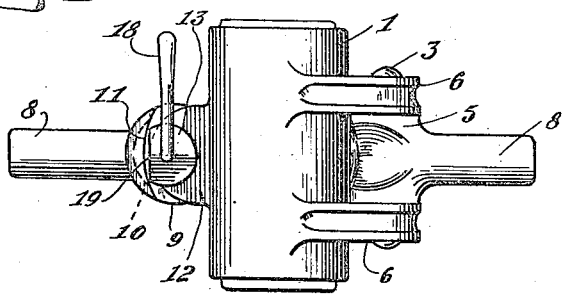
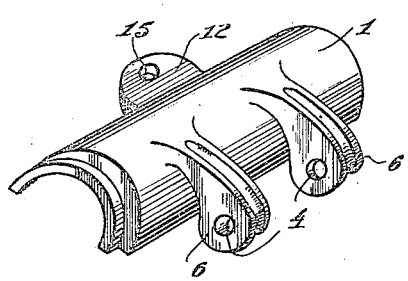
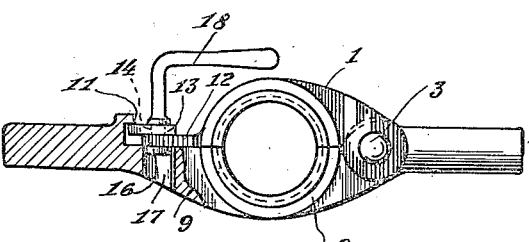
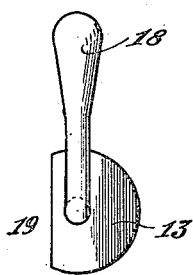
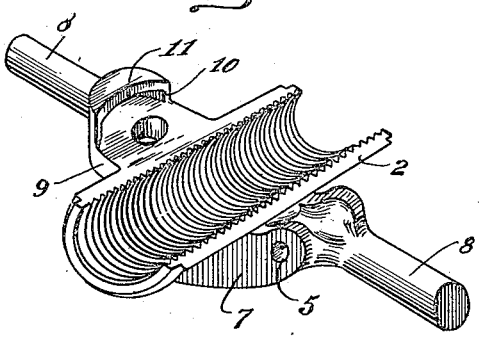
INVENTOR
C. C. Hartzell.
BY: Brease, Merkel, Saywell and Bond,
ATTY'S

UNITED STATES PATENT OFFICE.

CLYDE C. HARTZELL, OF PITTSBURGH, PENNSYLVANIA.

FASTENER FOR SECTIONAL COAL-AUGER NUTS.

1,368,928.  Specification of Letters Patent.  Patented Feb. 15, 1921.

Application filed November 3, 1919. Serial No. 335,422.

*To all whom it may concern:*

Be it known that I, CLYDE C. HARTZELL, a citizen of the United States, residing at Pittsburgh, in the county of Allegheny and State of Pennsylvania, have invented a new and useful Fastener for Sectional Coal-Auger Nuts, of which the following is a specification.

The invention relates to improvements in fasteners for sectional coal auger nuts in which means are provided for temporarily securing the sections of the nut together and holding them in such position that the drill can be fed as the same is rotated and has more especial reference to a fastener of this description which may be quickly and readily operated.

The objects of the invention are to provide a sectional coal auger nut including two hinged sections upon one of which is provided a fastener for temporarily securing the sections together in such a manner that there can be no lateral movement between the sections and to hold the sections securely together in order that the drill or auger may be fed through the nut as it is rotated.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a plan view of the nut with the fastener applied thereto, showing the same in the unlocked position.

Fig. 2 is a transverse sectional view through the nut, showing the same in the locked position.

Fig. 3 is a detail perspective view of the upper or hinged section of the nut with the locking member removed.

Fig. 4 is a detail perspective view of the lower or trunnion section of the nut.

Fig. 5 is a plan view of the fastening member.

A practical embodiment of the invention is disclosed in the accompanying drawings, forming a part of this specification in which similar numerals of reference indicate corresponding parts throughout the several views.

The nut includes the hinged section 1 and the trunnion section 2, which sections are hinged together in any suitable and well known manner such as the pin 3 which is located through apertures 4 and 5 in the connecting flanges 6 of the hinged section and the trunnion head 7 of the trunnion section respectively.

The trunnion section 2 is provided with the usual trunnions 8 which are located in alinement and upon opposite sides of the section, these trunnions being provided for the purpose of properly journaling the device in the usual manner. The trunnion section is provided upon one side with a head 9 which is preferably rounded at its outer end and provided with the upwardly disposed semi-annular flange 10 upon the upper edge of which is formed the half round horizontally disposed lip 11 which is spaced from the upper surface of the head 9.

The hinged section 1 is provided with the lug 12 adapted to be seated upon the head 9 when the nut is in the closed position. The locking disk 13 is pivotally mounted on the lug 12 by means of a suitable spindle 14 which passes through an aperture 15 in the lug, a head 16 being formed upon the lower end of the spindle, said head being received within the apertures 17, provided in the head 9, when the nut sections are in the closed position. The locking disk is provided with an operating handle 18 which is connected to the disk in axial alinement with the spindle 14 and is spaced above the hinged section sufficiently to allow it to be swung over the top thereof as shown in Fig. 2 when the disk is moved into the locked position.

In use when it is desired to lock the sections together in order that they will properly engage the ordinary screw threaded drill shank, the hinged member 1 is placed in the position as shown in Figs. 1 and 2, the lug 12 being seated upon the upper face of the head 9, the flat portion 19 of the locking disk being located in the position shown in Fig. 1. The handle of the locking disk is then moved to the position shown in Fig. 2, bringing a portion of the periphery of the disk beneath the horizontal lip 11 as shown in Fig. 2, locking the sections of the nut together. It is of course understood that both of the nut sections 1 and 2 must be provided with semi-circular screw threaded grooves which are for the purpose of providing proper means for feeding the screw threaded drill shank or auger through the nut by the rotation of the screw threaded nut or auger. This feature is of course old and has no especial bearing on the present invention, and the screw threaded shank or auger is not illustrated, as those skilled in the art will understand that the usual screw threaded shank or auger is employed.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. A fastener for sectional coal auger nuts including two nut sections hinged together at one side, a head formed upon the opposite free side of one section, a curved flange upon the head, an in-turned lip carried by the flange and spaced from the head, a lug upon the free side of the other section, said lug and head having flat meeting faces and a locking disk pivoted upon said lug upon an axis at right angles to the line of separation of the head and lug and arranged to engage the under side of said lip.

2. A fastener for sectional coal auger nuts including two nut sections hinged together at one side, a head formed upon the opposite free side of one section, a curved flange upon the head, an in-turned lip carried by the flange and spaced from the head, a lug upon the free side of the other section, said lug and head having flat meeting faces and a locking disk pivoted upon said lug upon an axis at right angles to the line of separation of the head and lug and arranged to engage the under side of said lip, said locking disk being provided with a flat face arranged to clear the lip.

In testimony that I claim the above, I have hereunto subscribed my name.

CLYDE C. HARTZELL.